(12) United States Patent
Hazay et al.

(10) Patent No.: US 8,934,630 B2
(45) Date of Patent: Jan. 13, 2015

(54) COMPRESSING BLOCK-CIPHER ENCRYPTED DATA

(75) Inventors: Camit Hazay, Yorktown Heights, NY (US); Ashish Jagmohan, Yorktown Heights, NY (US); Demijan Klinc, Yorktown Heights, NY (US); Hugo M. Krawczyk, Yorktown Heights, NY (US); Tal Rabin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/610,754

(22) Filed: Nov. 2, 2009

(65) Prior Publication Data

US 2011/0103580 A1    May 5, 2011

(51) Int. Cl.
 *H04K 1/00* (2006.01)
 *H04N 19/12* (2014.01)
 *H04L 29/06* (2006.01)
 *H04L 9/06* (2006.01)

(52) U.S. Cl.
 CPC .............. *H04L 69/04* (2013.01); *H04L 9/0637* (2013.01); *H04L 2209/30* (2013.01)
 USPC .......................................... 380/269; 380/28

(58) Field of Classification Search
 CPC .................................................... H03M 7/30
 See application file for complete search history.

(56) References Cited

U.S. PATENT DOCUMENTS

| | | | |
|---|---|---|---|
| 2004/0125817 A1* | 7/2004 | Miyazaki et al. | 370/411 |
| 2005/0169465 A1 | 8/2005 | Itani | |
| 2007/0255947 A1* | 11/2007 | Choudhury et al. | 713/161 |

OTHER PUBLICATIONS

Johnson, M., Wagner, D., and Ramchandran, K., "On Compressing Encrypted Data without the Encryption Key", Theory of Cryptography, Lecture Notes in Computer Science, 2004, Springer Berlin / Heidelberg, vol. 2951, p. 491-504.*

Thomas Peyrin, Henri Gilbert, Frédéric Muller, Matt Robshaw, "Combining Compression Functions and Block Cipher-Based Hash Functions", Advances in Cryptology—ASIACRYPT 2006, Lecture Notes in Computer Science vol. 4284, 2006, pp. 315-331.*

Daniel Schonberg, Stark C. Draper, and Kannan Ramchandran, "On Blind Compression of Encrypted Data Approaching the Source Entropy Rate", 2005.*

Maguluri, Siva Theja. "Compressing Encrypted Data." (2009).*

(Continued)

*Primary Examiner* — Alexander Lagor
(74) *Attorney, Agent, or Firm* — Scully, Scott, Murphy & Presser, P.C.; Jennifer Davis, Esq.

(57) ABSTRACT

A method, system and computer program product are disclosed for compressing encrypted data, wherein the data is encrypted by using a block encryption algorithm in a chained mode of operation, and the encrypted data is comprised of a set of N encrypted blocks, $C_1 \ldots C_N$. In one embodiment, the method comprises leaving block $C_N$ uncompressed, and compressing all of the blocks $C_1 \ldots C_N$ in a defined sequence using a Slepian-Wolf code. In an embodiment, the data is encrypted using an encryption key K, and the compressing includes compressing all of the blocks $C_1 \ldots C_N$ without using the encryption key. In one embodiment, the compressing includes outputting the blocks $C_1 \ldots C_N$ as a set of compressed blocks $CmprC_1 \ldots CmprC_{N-1}$, and the method further comprises decrypting $C_N$ to generate a reconstructed block $\hat{X}_n$, and decrypting and decompressing the set of compressed blocks using $\hat{X}_n$.

17 Claims, 7 Drawing Sheets

PREFERRED EMBODIMENT OF SYSTEM FOR COMPRESSION OF DATA ENCRYPTED USING BLOCK CIPHER AND CHAINING (56) References Cited

OTHER PUBLICATIONS

Wei Liu; Zeng, Wenjun; Lina Dong; Qiuming Yao, "Efficient Compression of Encrypted Grayscale Images," Image Processing, IEEE Transactions on , vol. 19, No. 4, pp. 1097,1102, Apr. 2010.*

Ahmed, H. H., Kalash, H. M., & Farag Allah, O. S. (2007). An Efficient Chaos-Based Feedback Stream Cipher (ECBFSC) for Image Encryption and Decryption. Informatica (03505596), 31(1), 121-129.*

Klinc, D.; Hazay, C.; Jagmohan, A; Krawczyk, H.; Rabin, T., "On Compression of Data Encrypted with Block Ciphers," Data Compression Conference, 2009. DCC '09. , vol., no., pp. 213,222, Mar. 16-18, 2009.*

Johnson, M.; Ishwar, P.; Prabhakaran, V.; Schonberg, D.; Ramchandran, K., "On compressing encrypted data," Signal Processing, IEEE Transactions on , vol. 52, No. 10, pp. 2992,3006, Oct. 2004.*

Klinc, D.; Hazay, C.; Jagmohan, A; Krawczyk, H.; Rabin, T., "On Compression of Data Encrypted with Block Ciphers," Data Compression Conference, 2009. DCC '09., vol., no., pp. 213,222, Mar. 16-18, 2009.*

Johnson, M.; Ishwar, P.; Prabhakaran, V.; Schonberg, D.; Ramchandran, K., "On compressing encrypted data," Signal Processing, IEEE Transactions on, vol. 52, No. 10, pp. 2992, 3006, Oct. 2004.*

* cited by examiner

LOSSLESS SOURCE CODE WITH DECODER SIDE-INFORMATION

FIG. 4

TRADITIONAL SYSTEM WITH COMPRESSION DONE FIRST

FIG. 5(a)

SYSTEM WITH ENCRYPTION DONE BEFORE COMPRESSION

FIG. 5(b)

PRIOR ART     CIPHER BLOCK CHAINING (CBC)

FIG. 6

COMPRESSOR

FIG. 7

JOINT DECRYPTION AND DECODING AT THE RECEIVER. IT IS PERFORMED SERIALLY FROM RIGHT TO LEFT

FIG. 8

PREFERRED EMBODIMENT OF SYSTEM FOR COMPRESSION OF DATA ENCRYPTED USING BLOCK CIPHER AND CHAINING

EMBODIMENT OF SYSTEM FOR COMPRESSION OF DATA ENCRYPTED USING BLOCK CIPHER AND CORRESPONDING SYSTEM FOR DECOMPRESSION AND DECRYPTION

FIG. 11

COMPRESSING BLOCK-CIPHER ENCRYPTED DATA

BACKGROUND OF THE INVENTION

1. Field of the Invention

This invention, generally, relates to compressing encrypted data, and more specifically, to compressing encrypted data without using or requiring knowledge of the encryption key.

2. Background Art

Traditionally in communication systems, data from a source is first compressed and then encrypted before it is transmitted over a channel to the receiver. While in many cases this approach is befitting, there exist scenarios where there is a need to reverse the order in which data encryption and compression are performed. Consider for instance a network of low-cost sensor nodes that transmit sensitive information over the internet to a recipient.

The sensor nodes need to encrypt data to hide it from potential eavesdroppers, but they do not necessarily want to compress it as that would require additional hardware and thus higher implementation cost. On the other hand, the network operator that is responsible for transferring the data to the recipient wants to compress the data to maximize the utilization of its resources. It is important to note that the network operator is not trusted and hence does not have access to the key used for encryption and decryption of data. If it had the key, it could simply decrypt data, compress and encrypt again.

Related work in the area of compression and encryption can be classified into three main categories. The first category includes systems and methods for compressing encrypted data i.e. systems in which compression is performed prior to encryption. This category includes the systems/methods described in U.S. Pat. No. 6,122,378 ('Data compression/encryption method and system'), U.S. Patent Application Publication No. 2007/0263876A1 ('In-memory compression and encryption') and U.S. Pat. No. 7,295,673 ('Method and system for securing compressed digital video'). The second category includes systems and methods for simultaneously performing compression and encryption, wherein the encryption key (or a constant value, repeating cipher-text) is assumed known during compression. This category includes the systems/methods described in U.S. Patent Application Publication No. 2004/0136566A1 ('Method and apparatus for encrypting and compressing multimedia data'), U.S. Pat. No. 6,122,379 ('Method and apparatus for performing simultaneous data compression and encryption'), and U.S. Patent Application Publication No. 2008/0162521 ('Compression of encrypted data in database management systems). The main shortcoming of the systems in these two categories is that they do not allow encryption after compression and without knowledge of the encryption key.

The third category includes the systems/methods described in the papers 'On Compressing Encrypted Data,' M. Johnson, P. Ishwar, V. Prabhakaran, D. Schonberg and K. Ramchandran, IEEE Transactions on Signal Processing, October 2004 (Johnson et al. I), and 'On Compressing Encrypted Data without the Encryption Key', M. Johnson, D. Wagner and K. Ramchandran, Theory of Cryptography Conference 2004. In these methods Slepian-Wolf coding principles are used to compress data encrypted with a one-time pad and with a stream cipher. These procedures, however, do not do compression of data encrypted with block ciphers in chaining modes, which are commonly used for most data.

Block ciphers with a fixed key are a bijection, therefore the entropy of an input is the same as that of the output. It follows that it is theoretically possible to compress the source to the same level as before encryption. However, in practice, encrypted data appears to be random and the conventional compression techniques do not yield desirable results. Consequently, it was long believed that encrypted data is practically incompressible. In the above-mentioned Johnson et al. I paper, the authors break that paradigm and show that the problem of compressing one-time pad encrypted data translates to the problem of compressing correlated sources, which was solved by Slepian and Wolf (see D. Slepian and J. Wolf, "Noiseless coding of correlated information sources," IEEE Trans. Info. Theory, vol. 19, pp. 471-480, July 1973) and for which practical and efficient codes are known. Compression is practically achievable due to a simple symbol-wise correlation between the key (one-time pad) and the encrypted message. However, when such correlation is more complex, as is the case with block ciphers, the approach to Slepian-Wolf coding utilized in Slepian et al. is not directly applicable.

Therefore, a need exists for a method for compressing encrypted data without knowledge of the compression key, wherein the encryption of the data has been performed by one of the popularly used block ciphers.

BRIEF SUMMARY

Embodiments of the invention provide a method, system and computer program product for compressing encrypted data, wherein said data is encrypted by using a block encryption algorithm in a chained mode of operation, and said encrypted data is comprised of a set of N encrypted blocks, $C_1 \ldots C_N$. In one embodiment, the method comprises leaving block $C_N$ uncompressed; and compressing all of the blocks $C_1 \ldots C_{N-1}$ in a defined sequence. In an embodiment, said data is encrypted using an encryption key K, and said compressing includes compressing all of the blocks $C_1 \ldots C_{N-1}$ without using the encryption key and with using a Slepian Wolf code.

In one embodiment, said compressing includes outputting the blocks $C_1 \ldots C_{N-1}$ as a set of compressed blocks Cmpr $C_1 \ldots$ Cmpr$C_{N-1}$, and the method further comprises decrypting $C_N$ to generate a reconstructed block $\hat{X}_N$, and decrypting and decompressing said set of compressed blocks using $\hat{X}_N$.

In an embodiment, the decrypting and decompressing includes performing Slepian-Wolf decoding to decompress said set of compressed bocks. In one embodiment, said decompressing includes decompressing said set of compressed blocks in a given sequence to generate a series of reconstructed blocks, including using $\hat{X}_N$ as side information to decompress Cmpr$C_{N-1}$ in said Slepian-Wolf decoding. In an embodiment, said decompressing includes, when decompressing each of the compressed blocks Cmpr$C_1 \ldots$ Cmpr $C_{N-1}$, using information from a previously generated one of the reconstructed blocks as side information in said Slepian-Wolf decoding.

In one embodiment, said data is encrypted using an initial vector IV, and said compressing includes compressing said initial vector using the Slepian-Wolf code. In an embodiment, the defined sequence is $C_{N-1}, C_{N-2}, C_{N-3} \ldots C_1$, and said compressing includes compressing said initial vector after compressing $C_1$.

Embodiments of the invention can be used to encrypt data produced by many block-ciphers (such as the popular AES cipher) when used in a chained mode of operation. Chained modes of operation such as CBC, CFB and OFB are the most commonly used modes in practice. Thus embodiments of the invention allow compression of data produced by commonly used encryption algorithms without requiring the encryption key.

In contrast to stream ciphers, such as the one-time pad, block ciphers are highly nonlinear and the correlation between the key and the ciphertext is, by design, hard to characterize. The present invention effectively addresses this difficulty can be circumvented and compresses block ciphers when they are used in conjunction with chaining modes. We note that AES is used as an example of a block cipher, but the techniques of this invention also apply to other block ciphers.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to compressing encrypted data without requiring access to a secure cryptographic key. Embodiments of the invention apply to block ciphers that are used in one of the applicable chaining modes. The description below and the diagrams are based on Cipher Block-Chaining (CBC), but the same principles are applicable to other modes that use an XOR operation for chaining.

Figure 1:
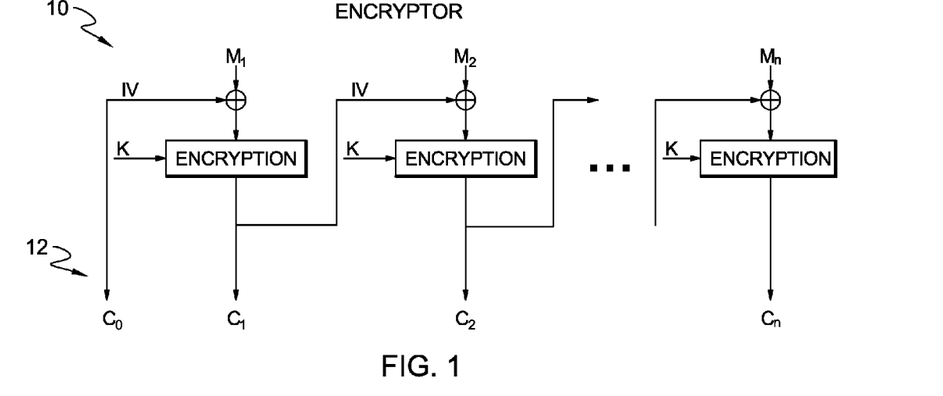
FIG. 1 shows an Encryptor that may be used with this invention.

FIG. 1 depicts a generic block encryption algorithm 10 employed in the CBC mode. Assuming that the plaintext message is comprised of N blocks M_1 through M_N, the output 12 of the encryptor is a set of N encrypted blocks C_0 thorough C_N, where CO_0 is the initialization vector IV.

Figure 2:
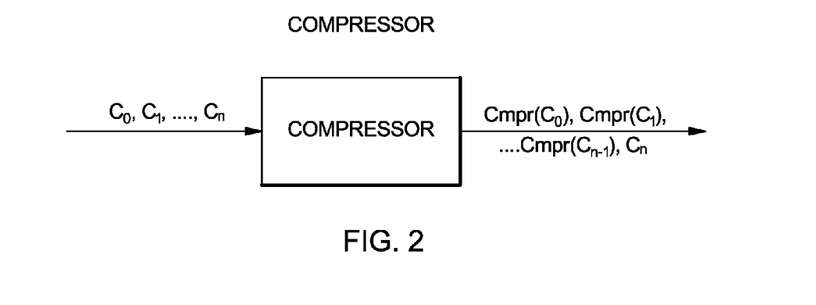
FIG. 2 illustrates a Compressor that may be used in the present invention.

The compressor is depicted in FIG. 2. The compressor does not have access to the cryptographic key used to encrypt and decrypt messages. Even without the knowledge of the cryptographic key, the compressor can compress encrypted and seemingly random data, thereby counting on the fact that the receiver, knowing the encryption key, will be able to jointly decompress and decrypt. It is assumed, though, that the compressor has knowledge about the source statistics. Generally, compression is performed as follows: the last block C_N is left in uncompressed form, while all the remaining encrypted block are compressed using an appropriate Slepian-Wolf code of a matching size.

Figure 3:
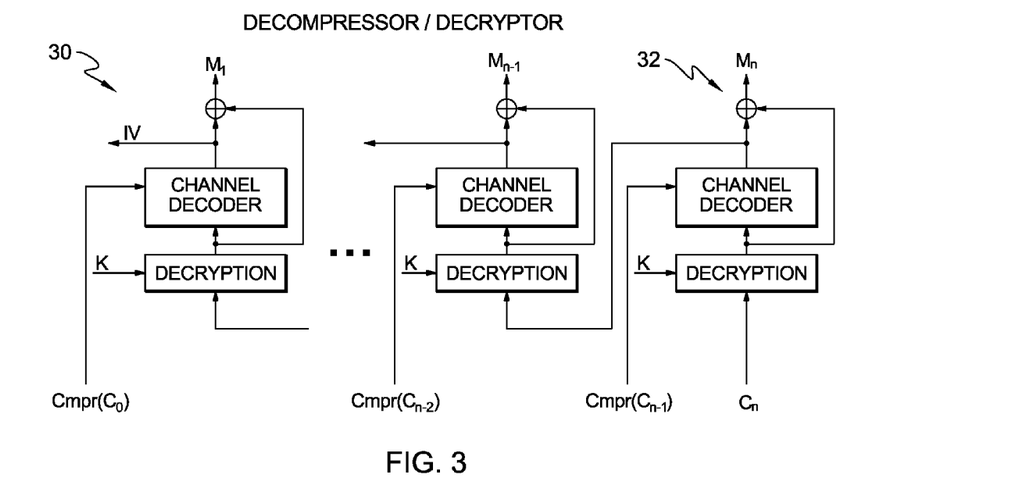
FIG. 3 depicts a Decompressor/decryptor that may be used with the present invention.

The decompression/decryption part of the receiver is depicted at 30 in FIG. 3. It is assumed, that the receiver has knowledge of the cryptographic key. First the receiver decrypts the uncompressed block C_N. At the output 32 of the decryptor we have (M_N XOR C_{N−1}). Now the receiver exploits the fact that C_{N_1} and (M_N XOR C_{N−1}) are strongly correlated. By the Slepian-Wolf theorem, the receiver can recover C_{N−1} using (M_N XOR C_{N−1}) and Cmpr(C_{N−1}). M_N is then simply C_{N−1} XOR (M_N XOR C_{N−1}).

With the knowledge of C_{N−1} and Cmpr(C_{N−2}), the receiver can recover M_{N−1} using the exact same procedure as described above. The same is repeated sequentially in backward-to-forward fashion until all message blocks are compressed and decrypted.

More specific examples of embodiments of the present invention are discussed below.

A formal definition of an encryption scheme is given in "Introduction To Modern Cryptography," by J. Katz and U. Lindell, Chapman & Hall/CRC, 2007. A private-key encryption scheme is a triple of algorithms (Gen, E, D), where Gen is a probabilistic algorithm that outputs a key K chosen according to some distribution that is determined by the scheme; the encryption algorithm E takes as input a key K and a plaintext message X and outputs a ciphertext $E_K(X)$; the decryption algorithm D takes as input a key K and a ciphertext $E_K(X)$ and outputs a plaintext X.

In private-key encryption schemes the same key is used for encryption and decryption algorithms. Private-key encryption schemes can be divided in two categories: block ciphers and stream ciphers. Stream ciphers encrypt plaintext one symbol at a time, typically by summing it with a key (XOR operation for binary alphabets). In contrast, block ciphers represent a different approach where encryption is accomplished by means of nonlinear mappings on input blocks of fixed length. Common examples of block ciphers are the Advanced Encryption Standard (AES) (see W. Mao, Modern Cryptography: Theory and Practice, Prentice Hall, 2003), and the Data Encryption Standard (DES) (see N. B. of Standards, Data Encryption Standard (DES). U.S. Department of Commerce, Washington D.C., 1977). Typically, block ciphers are not used as a stand-alone encryption procedure but are rather combined to work on variable length data using composition mechanisms known as chaining modes or modes of operation. The most common mode of operation is cipher-block chaining (CBC), discussed below.

Figure 4:
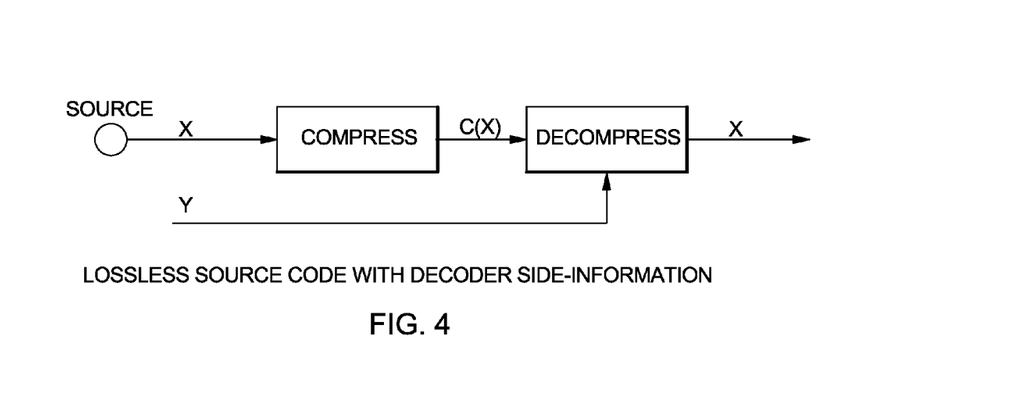
FIG. 4 illustrates lossless source coding with decoder side-information.

FIG. 4 illustrates the source coding problem with decoder side information. Consider random variables X (termed the source), and Y (termed the side-information), both over a finite-alphabet and with a joint probability distribution $P_{XY}$. Consider a sequence of independent realizations of (X, Y) denoted by $\{X_i, Y_i\}_{i=1}^n$.

The problem at hand is of losslessly encoding $\{X_i\}_{i=1}^n$, with $\{Y_i\}_{i=1}^n$, known only to the decoder. In Slepian et al., Slepian and Wolf showed that, asymptotically in block-length, this can be done at rates arbitrarily close to the conditional entropy H(X|Y). Practical Slepian-Wolf coding schemes use constructions based on good linear error-correcting codes (see A. Aaron and B. Girod, "Compression with side information using turbo codes," in IEEE Data Compression Conf., 2002, pp. 252-261; and J. Garcia-Frias, "Compression of correlated binary sources using turbo codes," IEEE Communications Letters, vol. 5, pp. 417-419, October 2001).

Figure 5A:
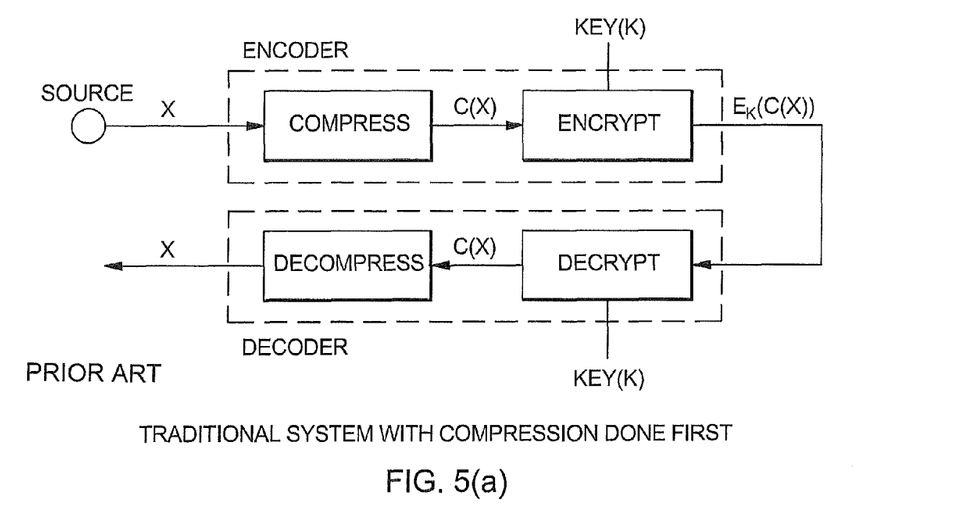
FIG. 5(a) shows a traditional compression/encryption system, with compression done before encryption.
Figure 5B:
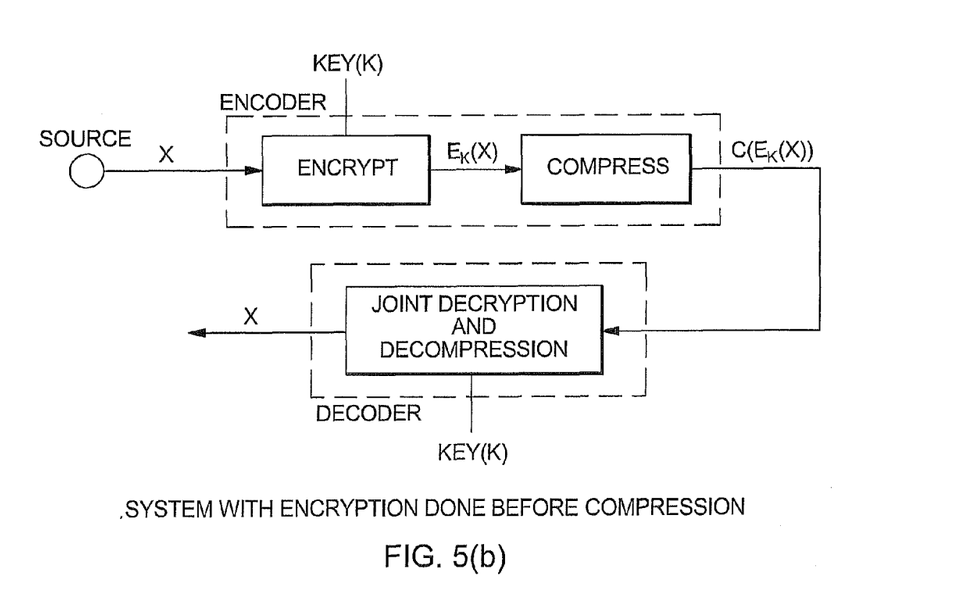
FIG. 5(b) shows a system with encryption done before compression as described, for example, in Johnson I

Of interest are systems which perform both compression and encryption, wherein only the encryptor has access to the key. Typically, in such systems, encryption is performed after compression as depicted in FIG. 5(a). This is a consequence of the traditional view which considers ciphertext data hard to compress without knowledge of the key. In the above mentioned Johnson et al. I paper, a system similar to FIG. 5(b) is considered instead, in which the order of the encryption and compression operations at the encoder is reversed. It may be noted that in this system, only the encryptor has access to the key. The authors consider encryption of a plaintext X using a one-time pad scheme, with a finite-alphabet key (pad) K, to generate the ciphertext $E_K(X)$, i.e.

$$E_K(X_j) \triangleq X_j \oplus K_j, \forall j \in Z$$

This is followed by compression, which is unknown of K, to generate the compressed ciphertext $C(E_K(X))$.

The key insight underlying the approach in Johnson, et al. I is that the problem of compression in this case can be formulated as a Slepian-Wolf coding problem. In this formulation, the ciphertext $E_K(X)$ is cast as a source, and the shared key K is cast as the decoder only side-information. The joint distribution of the source and side-information can be determined from the statistics of the source. For example, in the binary case with a uniformly distributed K and X with Pr[X=1]=p, $$P(E_K(X_j) \neq k | K=k) = p. \quad (1)$$

The decoder has knowledge of K, and of the source statistics. It uses this knowledge to reconstruct the ciphertext $E_K(X)$ from the compressed message $C(E_K(X))$, and to subsequently decrypt the plaintext X. This formulation is leveraged in Johnson, et al. I to show that exactly the same lossless compression rate, H(X), can be asymptotically achieved in the system shown in FIG. 5(b), as can be achieved in FIG. 5(a). Further, this can be done while maintaining information-theoretic security.

The one-time pad and stream ciphers, while convenient for analysis, are not the only forms of encryption in practice. In fact, the prevalent method of encryption uses block ciphers in chaining modes such as CBC. Thus, a desirable extension of the technique in Johnson, et al. I would be to conventional encryption schemes such as the popular AES encryption method. Attempting to do so, however, proves to be problematic. The method in Johnson, et al. I leverages the fact that in a one-time pad encryption scheme a simple symbol-wise correlation exists between the key K and the ciphertext $E_K(X)$, as seen in equation (1). Unfortunately, for block ciphers such as AES no such correlation structure is known. Moreover, any change in the plaintext is diffused in the ciphertext, and quantifying the correlation (or the joint probability distribution) of the key and the ciphertext is believed to be computationally infeasible and a requirement for the security of the block cipher.

The present invention effectively addresses this problem by exploiting the chaining modes popularly used with block ciphers. Based on this insight, this invention provides an approach for compressing data encrypted with AES, without knowledge of the key. As in Johnson, et al. I, the present invention is based on the use of Slepian-Wolf coding.

If a block cipher operates on each block of data individually, two identical inputs will produce two identical outputs. While this weakness does not necessarily enable an unauthorized user to understand contents of an individual block it can give him information about frequently occurring data patterns. To address this problem, various chaining modes, also called modes of operation, are used in conjunction with block ciphers. The idea is to randomize each plaintext block, by using a randomization vector derived as a function of previous encryptor inputs or outputs. The randomization prevents two identical plaintext blocks from being encrypted into two identical ciphertext blocks, thus preventing leakage of information about data patterns.

Figure 6:
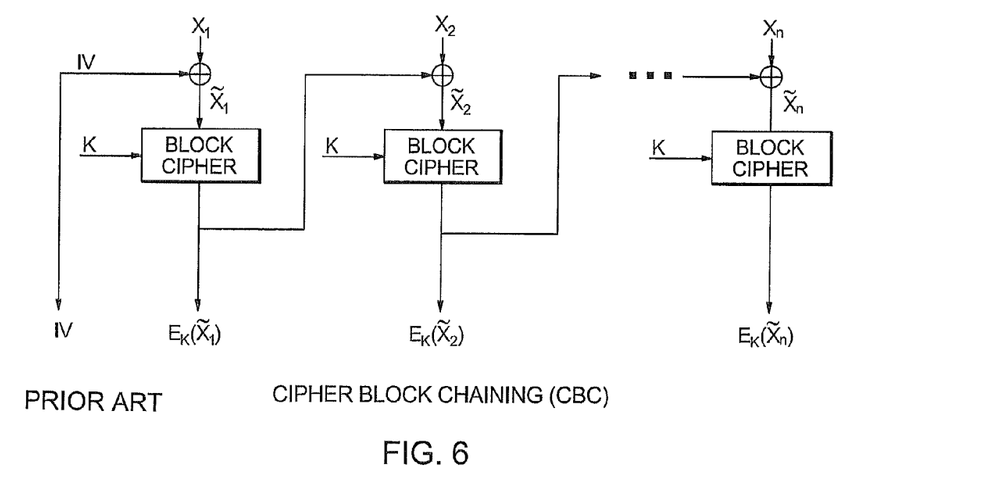
FIG. 6 depicts the Cipher Block Chaining mode of operation used, for example, by the AES cryptosystem.

The CBC mode of operation, depicted in FIG. 6 is a widely used block cipher. In this Figure, $X_i$ denotes the i-th plaintext block. An initial pseudorandom vector, used to initiate the chaining, is denoted as IV. Ciphertext $E_K(X)$ is generated by applying the AES encryption algorithm with key K to the plaintext X. In the CBC mode, each plaintext block X is randomized prior to encryption, by being XOR-ed with the ciphertext block corresponding to the previous plaintext block $X_{i-1}$, to obtain $\tilde{X}_i$. Thus, the i-th ciphertext block is generated as $$E_K(\tilde{X}_i) = E_K(X_i \oplus E_K(\tilde{X}_{i-1})),$$

where the pseudorandom vector IV, assumed to be drawn uniformly from the source alphabet, is used instead of $E_K(\tilde{X}_0)$. This method of chaining ensures that frequently occurring plaintext patterns do not lead to repeating ciphertext patterns. Note that block ciphers in CBC mode are employed as the default mechanism in widespread security standards such as IPSec (see S. Kent and K. Seo, "Security architecture for the internet protocol," in RFC 4301, December 2005) and TLS/SSL (see T. Dierks and E. Rescorla, "The tls protocol—version 1.2," in RFC 5246, August 2008) and hence it is the prevalent method of encrypting internet traffic. In the discussion below, the length of a plaintext block is represented as m, and $X_i$ and $\tilde{X}_i$ are drawn from the same binary extension field $X^m$. Further, $X_i$ is generated by an i.i.d. source with marginal distribution $P_X$.

The statistical relationship between the key K and the i-th AES encrypted ciphertext $E_K(\tilde{X}_i)$ is hard to characterize. However, the joint distribution of the randomization vector $E_K(\tilde{X}_{i-1})$ and the i-th input to the AES encryptor $\tilde{X}_i$ is easier to characterize, as it is governed by the distribution of the plaintext block $X_i$. For example, in the i.i.d. source case being considered, $E_K(\tilde{X}_{i-1})$ and $X_i$ are related through a symbol-wise model governed by the distribution $P_X$. The correlation induced by the use of the chaining mode can be exploited to allow compression of encrypted data using Slepian-Wolf coding shown below.

Figure 7:
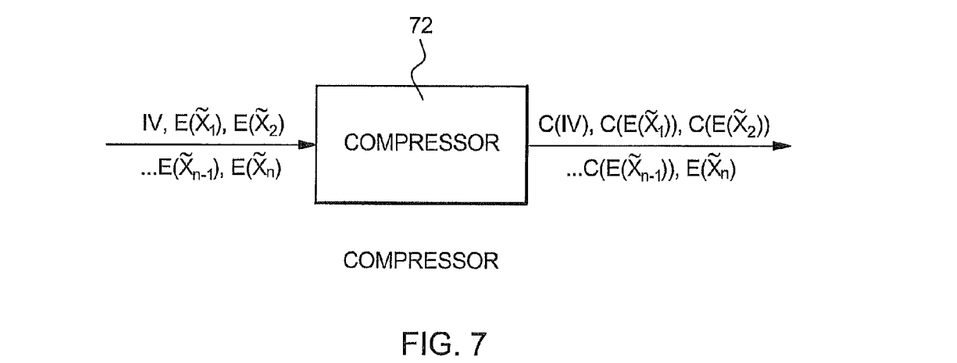
FIG. 7 illustrates another view of a compressor that may be used in the implementation of the invention.

Let $\{C_{m,R}, D_{m,R}\}$ denote an order m Slepian-Wolf code with encoding rate R. Here, the Slepian-Wolf encoding function $C_{m,R}$ is a mapping from $X^m$ to the index set $\{1, \ldots, 2^{mR}\}$, and the Slepian-Wolf decoding function $D_{m,R}$ is a mapping from $\{1, \ldots, 2^{mR}\} \times X^m$ to $X^m$. The compression method is illustrated in FIG. 7. The input to the compressor 72 is comprised of the IV and n ciphertext blocks $E_k(\tilde{X}_i)$, $1 \leq i \leq n$, generated by the AES cryptosystem running in the CBC mode. Since $E_K(\tilde{X}_i) \in X^m$, the total length of the input sequence is $(n+1) \cdot m \cdot \log|X|$ bits. The compressor applies the Slepian-Wolf encoder $C_{m,R}$ to the IV and each of the first n−1 ciphertext blocks independently, while the n-th block is left unchanged. Thus, the output of the compressor is the sequence $C(IV), C(E_K(\tilde{X}_1)), C(E_K(\tilde{X}_2)), \ldots C(E_K(\tilde{X}_{n-1})), E_K(\tilde{X}_n)$, where the subscripts are omitted for notational simplicity. The length of the output sequence is $n \cdot m \cdot R + m \cdot \log|X|$ bits. Thus, the compressor achieves a compression factor of $$\frac{(n+1) \cdot m \cdot \log|X|}{n \cdot m \cdot R + m \cdot \log|X|} \approx \frac{\log|X|}{R}$$

for large n. Note that the compressor does not need to know the key K. Also, note that this approach only requires a compressed IV, which by itself is incompressible, therefore no performance loss is inflicted by the uncompressed last block.

Figure 8:
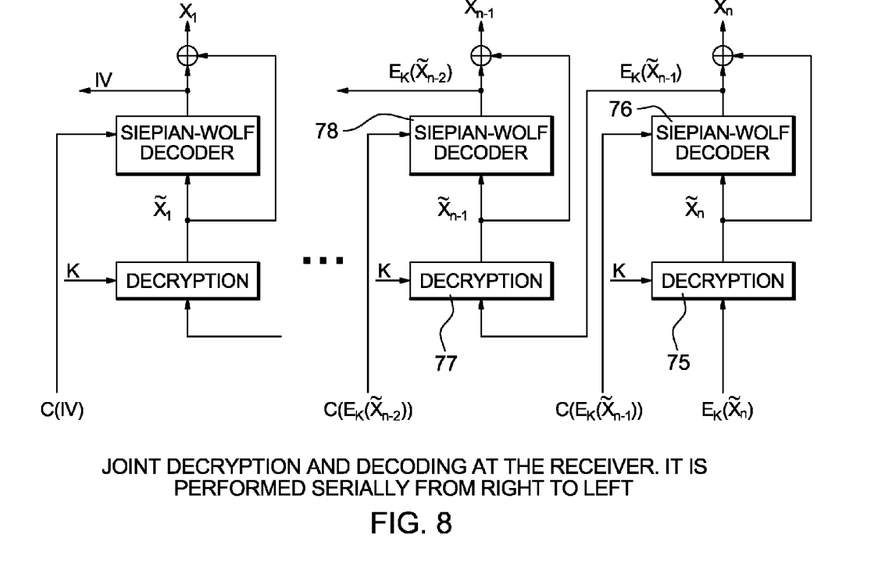
FIG. 8 shows joint decryption and decoding in accordance with embodiments of this invention.

The joint decompression and decryption method is shown in FIG. 8. The received compressed sequence is decrypted and decompressed serially, from right to left. In the first step $E_K(\tilde{X}_n)$, which is received without compression, is decrypted at 75 using the key K to generate $X_n$. Next, Slepian-Wolf decoding is performed at 76 to reconstruct $E_K(\tilde{X}_{n-1})$ using $\tilde{X}_n$ as side-information, and the compressed bits $C(E_K(\tilde{X}_{n-1}))$. The decoder computes $\hat{E} \triangleq D(C(E_K(\tilde{X}_{n-1})), \tilde{X}_n)$, such that $\hat{E} = E_K(\tilde{X}_{n-1}))$ with high-probability if the rate R is high enough. Once $E_K(\tilde{X}_{n-1})$ has been recovered by the Slepian-Wolf decoder, the plaintext block can now be reconstructed as $X_n = E_K(\tilde{X}_{n-1}) \oplus \tilde{X}_n$. The decoding process now proceeds serially with $E_K(\tilde{X}_{n-1})$ decrypted at 77 to generate $\tilde{X}_{n-1}$, which acts as the new Slepian-Wolf side-information at 78. This continues until all plaintext blocks have been reconstructed.

For large m, it follows from the Slepian-Wolf theorem that the rate required to ensure correct reconstruction of the (i−1)-th block with high probability is given as $$R = H(E_K(\tilde{X}_{i-1})|\tilde{X}_i) = H(E_K(\tilde{X}_{i-1})|E_K(\tilde{X}_{i-1}) \oplus X_i) \leq H(E_K(\tilde{X}_{i-1}) \oplus \tilde{X}_i|E_K(\tilde{X}_{i-1})) = H(X_i).$$

If it is assumed that $E_K(\tilde{X}_{i-1})$ has a uniform distribution, equation (3) becomes an equality. In practice, in is typically small. In this case, the required rate R is a function of $P_X$, m, the acceptable decoding error probability, and the non-ideal Slepian-Wolf codes used.

The above description focuses on the CBC mode as the most common form of encryption, but the techniques of this invention can be extended to other CBC-like modes of operation.

Figure 9:
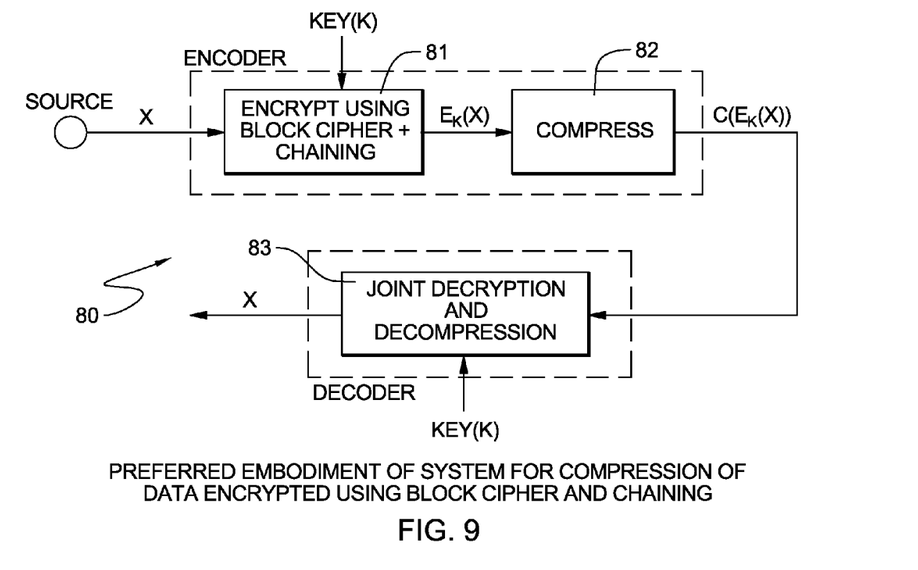
FIG. 9 shows an embodiment of the system for compressing data encrypted with a block cipher and chaining, where compression is done without knowledge of the encryption key.

FIG. 9 gives an overview of a system 80 for compression of data encrypted using a block cipher in chaining mode. The source is encrypted using a block cipher 81 in chaining mode, using a key K. The resultant ciphertext $E_K(X)$ is compressed by the compressor 82. The compressed cipher text $C(E_K(X))$ is transmitted to the joint decoder and decompressor 83 which uses the key K to decode the data X. The compression and decompression/decryption steps are performed as shown in FIGS. 6-8.

Figure 10:
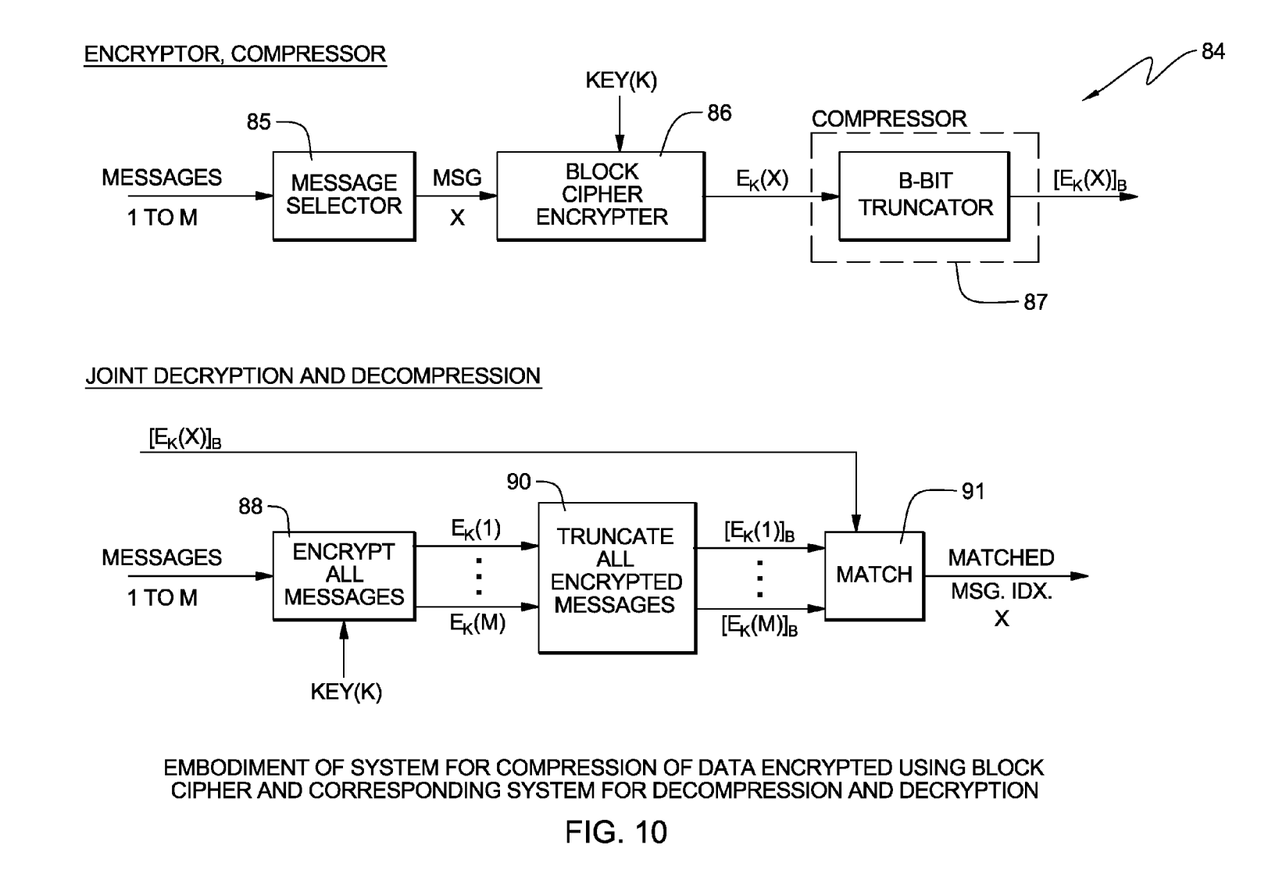
FIG. 10 shows another embodiment of a system where data encrypted with a block cipher is compressed without knowledge of the encryption key, and of the corresponding decompression and decryption system.

FIG. 10 shows another embodiment of a system 84 for compressing encrypted data without knowledge of the compression key, wherein the encryption of the data has been performed by one of the popularly used block ciphers. In this case, the message to be transmitted, denoted X, is assumed to be one of M messages, selected by the message selector 85. The selected message is encrypted using the block cipher encryptor 86 using the key K. The resultant ciphertext $E_K(X)$ is sent to the compressor 87. The compressor compresses the ciphertext without knowledge of the key K, by truncating the ciphertext to B bits i.e. it discards all bits other than the first B bits of the ciphertext. The value of B is selected as a function of the allowable decoding-failure probability. The compressed ciphertext denoted $[E_K(X)]_B$ is then transmitted. Upon receiving $[E_K(X)]_B$, the joint decryption and decompression is done as follows. All possible messages 1 to M are encrypted, at 88, using the key K, to generate M ciphertexts $E_K(1)$ to $E_K(M)$. These M ciphertexts are each truncated, at 90, to B bits. The received bits $[E_K(X)]_B$ are compared to each of the truncated ciphertexts, and the message index corresponding to the matching ciphertext is, at 91, declared to be the communicated message. This allows simple compression of encrypted data in the case where the number of possible messages is small.

Figure 11:
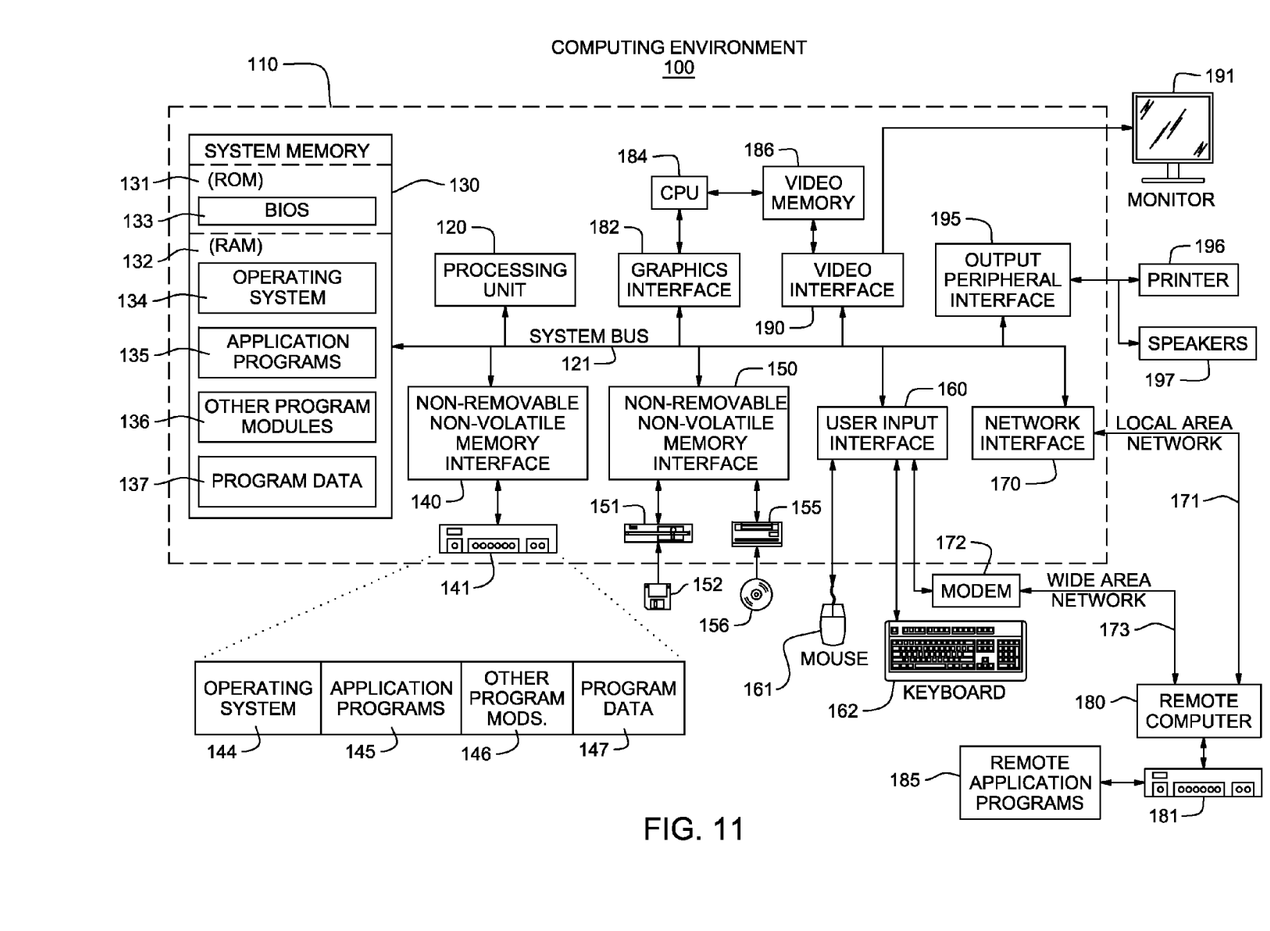
FIG. 11 illustrates a computing environment that may be used in embodiments of the invention.

FIG. 11 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 500.

With reference to FIG. 11, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 9 illustrate a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 11 provide storage of computer readable instructions, data structures, program modules and other data for the computer 110. In FIG. 9, for example, hard disk drive 141 is illustrated as storing operating system 144, application programs 545, other program modules 146, and program data 147. Note that these components can either be the same as or different from operating system 134, application programs 135, other program modules 136, and program data 137. Operating System 144, application programs 145, other program modules 146, and program data 547 are given different numbers here to illustrate that, at a minimum, they are different copies.

A user may enter commands and information into the computer 110 through input devices such as a keyboard 162 and pointing device 561, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 11 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Thus, methods, systems, and computer program products for inference-driven multi-source semantic search have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method of compressing data previously encrypted using block ciphers in a chained mode of operation and an encryption key K to generate a set of N encrypted blocks, $C_1 \ldots C_N$, while maintaining an ability to decompress and decrypt the compressed encrypted data using the encryption key K, the method comprising:
receiving said set of encrypted blocks $C_1 \ldots C_N$, said set of encrypted blocks being encrypted from a set of original data blocks $M_i \ldots M_N$, where $1 \le i \le N$, using said encryption key K and the block ciphers in the chained mode of encryption operation, and wherein the chained mode of encryption operation induces a correlation among the encrypted blocks $C_1 \ldots C_N$; and
using said correlation induced by the use of the chained mode of encryption operation to allow compression of the set of encrypted blocks $C_1 \ldots C_N$ in a manner that enables decompression and decryption of the compressed encrypted blocks $C_1 \ldots C_N$, using the encryption key K to obtain the original data blocks $M_i \ldots M_N$, including
compressing all of the encrypted blocks $C_1 \ldots C_{N-1}$ in a defined sequence;
leaving encrypted block $C_N$ uncompressed;
outputting all of the compressed, encrypted blocks $C_1 \ldots C_{N-1}$ to a receiver as a set of compressed encrypted blocks $CmprC_1 \ldots CmprC_{N-1}$; and
outputting the uncompressed, encrypted block $C_N$ to the receiver to enable the receiver to decompress all of the compressed, encrypted blocks $C_1 \ldots C_{N-1}$ and to decrypt the decomposed encrypted blocks using the encryption key K to obtain the set of original data blocks $M_i \ldots M_N$ by decrypting $C_N$ to a reconstructed block $\tilde{X}_n$, and decrypting and decompressing said set of compressed blocks $CmprC_1 \ldots CmprC_{N-1}$ using $\tilde{X}_n$.

2. The method according to claim 1, wherein said compressing includes compressing all of the encrypted blocks $C_1 \ldots C_{N-1}$ using a Slepian-Wolf code without using the encryption key.

3. The method according to claim 1, wherein said encrypted blocks being encrypted using an initial vector IV, and said compressing includes compressing said initial vector using a Slepian-Wolf code.

4. The method according to claim 3, wherein said defined sequence is $C_{N-1}, C_{N-2}, C_{N-3} \ldots C_1$.

5. The method according to claim 4, wherein said compressing includes compressing said initial vector after compressing $C_1$.

6. The method according to claim 2, wherein the Slepian-Wolf code is a low-density parity-check matrix based code with block size equal to the encryption block size, and with rate determined as a function of the source statistics, the acceptable decoding error probability and the block length.

7. The method according to claim 1, further comprising:
performing Slepian-Wolf decoding to decompress said set of compressed encrypted blocks.

8. The method according to claim 7, wherein said performing Slepian-Wolf decoding includes:
decompressing said set of compressed blocks $CmprC_1 \ldots CmprC_{N-1}$ in a given sequence to generate a series of reconstructed blocks, including using $\tilde{X}_n$ as side information to decompress $CmprC_{N-1}$ in said Slepian-Wolf decoding; and when decompressing each of the compressed blocks $CmprC_1 \ldots CmprC_{N-1}$, using information from a previously generated one of the reconstructed blocks as side information in said Slepian-Wolf decoding.

9. The method according to claim 7, wherein the decrypting includes using $\tilde{X}_n$ to decode $CmprC_{N-1}$ to generate a decrypted block $\tilde{X}_{n-1}$.

10. A compression system for compressing data previously encrypted using block ciphers in a chained mode of operation and an encryption key K to generate a set of N encrypted blocks, $C_1 \ldots C_N$, while maintaining an ability to decompress and decrypt the compressed encrypted data using the encryption key K, the system comprising:

one or more microprocessors configured for:
receiving said set of encrypted blocks $C_1 \ldots C_N$, said set of encrypted blocks being encrypted from a set of original data blocks $M_i \ldots M_N$, where $1 \leq i \leq N$, using said encryption key K and the block ciphers in the chained mode of encryption operation, and wherein the chained mode of encryption operation induces a correlation among the encrypted blocks $C_1 \ldots C_N$; and
using said correlation induced by the use of the chained mode of encryption operation to allow compression of the set of encrypted blocks $C_1 \ldots C_N$ in a manner that enables decompression and decryption of the compressed encrypted blocks $C_1 \ldots C_N$, using the encryption key K to obtain the original data blocks $M_i \ldots M_N$, including
compressing all of the encrypted blocks $C_1 \ldots C_{N-1}$ in a defined sequence using a Slepian-Wolf code;
leaving encrypted block $C_N$ uncompressed;
outputting all of the compressed, encrypted blocks $C_1 \ldots C_{N-1}$ to a receiver as a set of compressed encrypted blocks $CmprC_1 \ldots CmprC_{N-1}$; and
outputting the uncompressed, encrypted block $C_N$ to the receiver to enable the receiver to decompress all of the compressed, encrypted blocks $C_1 \ldots C_{N-1}$ and to decrypt the decomposed encrypted blocks using the encryption key K to obtain the set of original data blocks $M_i \ldots M_N$ by decrypting $C_N$ to a reconstructed block $\tilde{X}_n$, and decrypting and decompressing said set of compressed blocks $CmprC_1 \ldots CmprC_{N-1}$ using $\tilde{X}_n$.

11. The system according to claim 10, wherein said compressing includes compressing all of the encrypted blocks $C_1 \ldots C_{N-1}$ without using the encryption key.

12. The system according to claim 10, wherein said one or more microprocessors are further configured for performing Slepian-Wolf decoding to decompress said set of compressed encrypted blocks.

13. The system according to claim 12 wherein said decompressing includes decompressing said set of compressed blocks $CmprC_1 \ldots CmprC_{N-1}$ in a given sequence to generate a series of reconstructed blocks, including using $\tilde{X}_n$ as side information to decompress $CmprC_{n-1}$ in said Slepian-Wolf decoding.

14. An article of manufacture comprising:
at least one tangible computer readable device having computer readable program code logic tangibly embodied therein to execute a machine instruction in a processing unit for compressing data previously encrypted by using block ciphers in a chained mode of operation and an encryption key K to generate a set of N encrypted blocks, $C_1 \ldots C_N$, while maintaining an ability to decompress and decrypt the compressed encrypted data using the encryption key K, and said computer readable program code logic, when executing, performing the following
receiving said set of encrypted blocks $C_1 \ldots C_N$, said set of encrypted blocks being encrypted from a set of original data blocks $M_i \ldots M_N$, where $1 \leq i \leq N$, using said encryption key K and the block ciphers in the chained mode of encryption operation, and wherein the chained mode of encryption operation induces a correlation among the encrypted blocks $C_1 \ldots C_N$; and
using said correlation induced by the use of the chained mode of encryption operation to allow compression of the set of encrypted blocks $C_1 \ldots C_N$ in a manner that enables decompression and decryption of the compressed encrypted blocks $C_1 \ldots C_N$, using the encryption key K to obtain the original data blocks $M_i \ldots M_N$, including
compressing all of the encrypted blocks $C_1 \ldots C_{N-1}$ in a defined sequence using a Slepian-Wolf code;
leaving encrypted block $C_N$ uncompressed;
outputting all of the compressed, encrypted blocks $C_1 \ldots C_{N-1}$ to a receiver as a set of compressed encrypted blocks $CmprC_1 \ldots CmprC_{N-1}$; and
outputting the uncompressed, encrypted block $C_N$ to the receiver to enable the receiver to decompress all of the compressed, encrypted blocks $C_1 \ldots C_{N-1}$ and to decrypt the decomposed encrypted blocks using the encryption key K to obtain the set of original data blocks $M_i \ldots M_N$ by decrypting $C_N$ to a reconstructed block $\tilde{X}_n$, and decrypting and decompressing said set of compressed blocks $CmprC_1 \ldots CmprC_{N-1}$ using $\tilde{X}_n$.

15. The article of manufacture according to claim 14, said compressing includes compressing all of the encrypted blocks $C_1 \ldots C_{N-1}$ without using the encryption key.

16. The article of manufacture according to claim 14, wherein said computer readable program code logic, when executing, performs the following:
performing Slepian-Wolf decoding to decompress said set of compressed encrypted blocks.

17. The article of manufacture according to claim 16, wherein performing Slepian-Wolf decoding includes:
decompressing said set of compressed blocks $CmprC_1 \ldots CmprC_{N-1}$ in a given sequence to generate a series of reconstructed blocks, including using $\tilde{X}_n$ as side information to decompress $CmprC_{N-1}$ in said Slepian-Wolf decoding; and
when decompressing each of the compressed blocks $CmprC_1 \ldots CmprC_{N-1}$, using information from a previously generated one of the reconstructed bocks as side information in said Slepian-Wolf decoding.

* * * * *